(12) United States Patent
Hsieh et al.

(10) Patent No.: US 8,219,931 B2
(45) Date of Patent: Jul. 10, 2012

(54) METHOD FOR PROMPTING OUTSTANDING EVENT IN SCREEN LOCK STATE, ELECTRONIC DEVICE THEREOF, AND STORAGE MEDIUM THEREOF

(75) Inventors: Chin-Ying Hsieh, Taoyuan County (TW); Sih-Jie Gu, Taoyuan County (TW); Drew Bamford, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 772 days.

(21) Appl. No.: 12/353,233

(22) Filed: Jan. 13, 2009

(65) Prior Publication Data
US 2009/0265666 A1    Oct. 22, 2009

(30) Foreign Application Priority Data
Apr. 16, 2008 (TW) ............................. 97113775 A

(51) Int. Cl.
  *G06F 3/048* (2006.01)
(52) U.S. Cl. ........ 715/835; 715/765; 715/864; 345/169; 709/204
(58) Field of Classification Search .................. 715/700, 715/752, 753, 781, 792, 835, 764, 765, 864; 709/204; 345/169
See application file for complete search history.

(56) References Cited

U.S. PATENT DOCUMENTS

| | | | |
|---|---|---|---|
| 7,356,361 B1 | 4/2008 | Hawkins et al. | |
| 7,949,952 B2 * | 5/2011 | Hawley et al. | 715/751 |
| 7,996,045 B1 * | 8/2011 | Bauer et al. | 455/566 |
| 2003/0005126 A1 * | 1/2003 | Schwartz et al. | 709/227 |
| 2004/0172455 A1 * | 9/2004 | Green et al. | 709/207 |
| 2005/0166154 A1 * | 7/2005 | Wilson et al. | 715/751 |
| 2005/0268237 A1 * | 12/2005 | Crane et al. | 715/732 |
| 2006/0174207 A1 * | 8/2006 | Deshpande | 715/758 |
| 2007/0300140 A1 * | 12/2007 | Makela et al. | 714/799 |
| 2008/0098331 A1 * | 4/2008 | Novick et al. | 715/835 |
| 2008/0201649 A1 * | 8/2008 | Mattila et al. | 715/763 |
| 2008/0220751 A1 * | 9/2008 | De Bast | 455/414.2 |
| 2009/0249247 A1 * | 10/2009 | Tseng et al. | 715/808 |

FOREIGN PATENT DOCUMENTS

| | | |
|---|---|---|
| CN | 1662086 | 8/2005 |
| TW | 200611204 | 4/2006 |
| WO | 2008004123 | 1/2008 |

OTHER PUBLICATIONS

"Second Office Action of China Counterpart Application", issued on Aug. 3, 2011, p. 1-p. 8, in which the listed reference was cited.
"First Office Action of China Counterpart Application", issued on Jan. 6, 2011, p. 1-p. 7, in which the listed reference was cited.
"Office Action of Taiwan Counterpart Application", issued on Oct. 14, 2011, p. 1-p. 8, in which the listed references were cited.

\* cited by examiner

*Primary Examiner* — Xiomar L Bautista
(74) *Attorney, Agent, or Firm* — Jianq Chyun IP Office

(57) ABSTRACT

A method for prompting an outstanding event in screen lock state, an electronic device thereof, and a storage medium thereof are provided. In the present method, at least one outstanding event type is obtained first, wherein a corresponding occurrence time of each outstanding event type is greater than 0. Next, an amount of the outstanding event type is counted. Finally, a displaying position of an icon of each outstanding event type on a screen of the electronic device is adjusted according to the amount of the outstanding event types. As a result, a user can get the outstanding event type and the occurrence time thereof by the information shown on the screen, so as to increase the convenience of using the electronic device.

23 Claims, 3 Drawing Sheets

METHOD FOR PROMPTING OUTSTANDING EVENT IN SCREEN LOCK STATE, ELECTRONIC DEVICE THEREOF, AND STORAGE MEDIUM THEREOF

CROSS-REFERENCE TO RELATED APPLICATION

This application claims the priority benefit of Taiwan application serial No. 97113775, filed on Apr. 16, 2008. The entirety of the above-mentioned patent application is hereby incorporated by reference herein and made a part of this specification.

BACKGROUND OF THE INVENTION

1. Field of the Invention

The present invention relates to a method for prompting outstanding events. More particularly, the present invention relates to a method for prompting outstanding events in a screen lock state, and electronic device thereof, and a storage medium thereof.

2. Description of Related Art

With development of technology, only integrating multiple functions to an electronic device cannot satisfy demands of customers. Besides a slim and elegant profile, operation convenience of the electronic device with multiple functions is also required, so as to cope with increasingly stringent requirements of the customers. Taking a widely used mobile phone as an example, a hardware keyboard is conventionally applied to function as an input interface thereof. However, since a touch screen has features of convenient utilization, intuitive operation, durability and low cost, etc., the hardware keyboard is then replaced by the touch screen, and accordingly operation convenience of the mobile phone is improved.

Though it is convenient to operate the mobile phone via the touch screen, manufactures of the mobile phones have to develop a mechanism for preventing mistouching of the touch screen, so as to prevent activation of an unintended function caused by mistouching of the touch screen. In other words, when the mobile phone is not operated for a while, it may be automatically set to a screen lock state, so as to turn off an input function of the touch screen. Such mechanism is essential when the mobile phone is put into a pocket or a bag. Once the mobile phone is set to the screen lock state, misdialing of the mobile phone may be avoided.

Taking a commonly used mobile phone as an example, after the mobile phone enters the screen lock state, a user may observe icons on the screen for indication of missed calls or missed messages. However, displaying positions of the icons on the screen are fixed and cannot be changed. Namely, even if there is no any missed call or missed message, the user may still observe the icons displayed in a form of gray level at the fixed displaying positions. Therefore, the user may mistakenly consider there are still missed calls or missed messages to be checked, so that utilization convenience of the mobile phone is influenced.

SUMMARY OF THE INVENTION

Accordingly, the present invention is directed to a method for prompting outstanding events in a screen lock state, by which corresponding information of the outstanding events is provided to a user when an electronic device is in the screen lock state.

The present invention is directed to an electronic device, which may automatically adjust displaying positions of corresponding icons according to an amount of outstanding event types when the electronic device is in a screen lock state, so as to facilitate observation of a user.

To achieve the aforementioned or other advantages, the present invention provides a method for prompting outstanding events in a screen lock state, which is adapted to an electronic device in the screen lock state, wherein the electronic device includes a screen. The method may be described as follows. First, at least one outstanding event type is obtained, wherein corresponding occurrence time of each outstanding event type is greater than 0. Next, an amount of the outstanding event types is counted. Finally, a displaying position of an icon of each outstanding event type on the screen is adjusted according to the amount of the outstanding event types.

In an embodiment of the present invention, the outstanding event type at least includes one of missed call, missed message, missed voice mail and missed mail, etc.

In an embodiment of the present invention, the method further includes horizontally splitting the screen into a plurality of areas, wherein one of the areas is taken as a specific area. Step of adjusting the displaying position of the icon on the screen according to the amount of the outstanding event types includes displaying the icon in the specific area according to the amount.

In an embodiment of the present invention, the step of displaying the icon in the specific area include dividing the specific area into at least one displaying block matching the amount according to a size of the specific area and the amount of the outstanding event types, and respectively displaying one of the icons in each displaying block. Method of displaying the icons further includes averagely arranging and displaying the icon in the displaying block.

In an embodiment of the present invention, step of respectively displaying the icons in each of the displaying blocks further includes displaying the occurrence time of each outstanding event type corresponding to the icon. The step of displaying the occurrence time includes overlappedly displaying a specific icon at the displaying position of the icon. Wherein, the specific icon includes the occurrence time.

In an embodiment of the present invention, the method further includes renewing occurrence time of the corresponding outstanding event type when an outstanding event belonging to one of the outstanding event types is detected, and obtaining all of the outstanding event types with the corresponding occurrence time thereof being greater than 0.

In an embodiment of the present invention, the method further includes obtaining all of the outstanding event types with corresponding occurrence time thereof being greater than 0 when the electronic device enters the screen lock state.

According to another aspect of the present invention, the present invention provides an electronic device including a screen, an outstanding event type obtaining module, an amount counting module and an icon adjusting and displaying module. The outstanding event type obtaining module is used for obtaining at least one outstanding event type, and corresponding occurrence time of each outstanding event type is greater than 0. The amount counting module is used for counting an amount of the outstanding types. The icon adjusting and displaying module is used for adjusting a displaying position of an icon of each outstanding event type on a screen according to the amount of the outstanding event types.

In an embodiment of the present invention, the outstanding event type at least includes one of missed call, missed message, missed voice mail and missed mail, etc.

In an embodiment of the present invention, the icon adjusting and displaying module is used for displaying the icon in a specific area of the screen according to the amount of the outstanding event types. The electronic device further includes a screen image splitting module for horizontally splitting the screen into a plurality of areas, wherein one of the areas is defined as the specific area.

In an embodiment of the present invention, the icon adjusting and displaying module is used for dividing the specific area into at least one displaying block matching the amount according to a size of the specific area and the amount of the outstanding event types, and respectively displaying one of the icons in each displaying block. Method of displaying the icons further includes averagely arranging and displaying the icon in the displaying block.

In an embodiment of the present invention, the icon adjusting and displaying module is used for displaying the occurrence time of each outstanding event type corresponding to the icon. Wherein, the icon adjusting and displaying module overlappedly displays a specific icon at a displaying position of the icon, and the specific icon includes the occurrence time.

In an embodiment of the present invention, the electronic device further includes an outstanding event detecting module for detecting outstanding events belonging to the outstanding event types, and renewing the occurrence time of the corresponding outstanding event type.

In an embodiment of the present invention, the outstanding event type obtaining module is used for obtaining all of the outstanding event types with corresponding occurrence time thereof being greater than 0 when the outstanding event detecting module detects an outstanding event.

In an embodiment of the present invention, the outstanding event type obtaining module is used for obtaining all of the outstanding event types with corresponding occurrence time thereof being grater than 0 when the electronic device enters the screen lock state.

According to another aspect of the present invention, the present invention provides a storage medium for storing a computer program. The computer program includes a plurality of program codes, which may be loaded to an electronic device, so that the electronic device may execute the aforementioned method for prompting outstanding events in a screen lock state.

In the present invention, when the electronic device enters the screen lock state, all of the outstanding event types with corresponding occurrence time thereof being grater than 0 are obtained, and displaying positions of corresponding icons are automatically adjusted according to an amount of outstanding event types. Therefore, the user may conveniently check all the outstanding event types with the corresponding occurrence time thereof being grater than 0 in the screen lock state.

In order to make the aforementioned and other objects, features and advantages of the present invention comprehensible, a preferred embodiment accompanied with figures is described in detail below.

DESCRIPTION OF EMBODIMENTS

To fully convey the spirit of the present invention, embodiments are provided for describing the present invention in detail.

Figure 1:
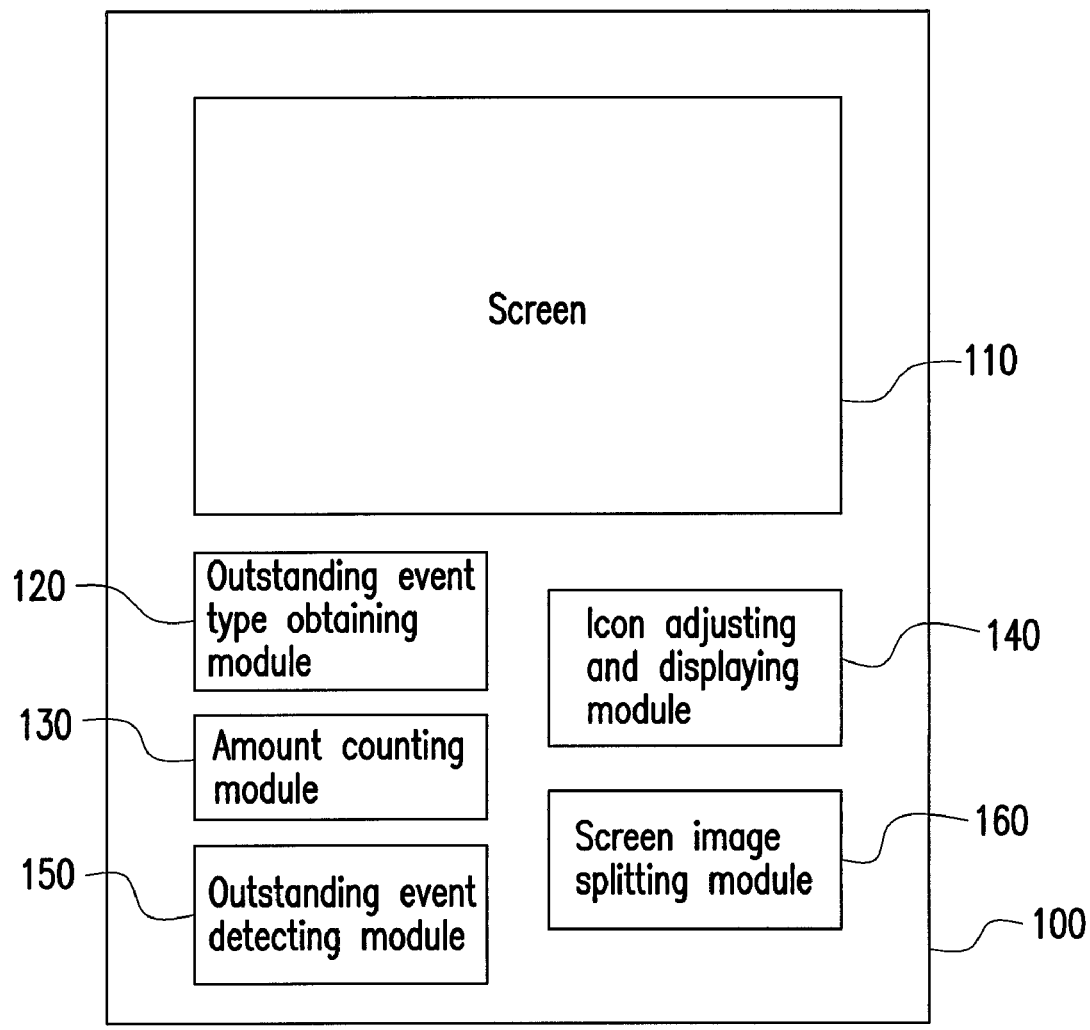
FIG. 1 is a block diagram illustrating an electronic device according to an embodiment of the present invention.

FIG. 1 is a block diagram illustrating an electronic device according to an embodiment of the present invention. Referring to FIG. 1, the electronic device 100 includes a screen 110, an outstanding event type obtaining module 120, an amount counting module 130, an icon adjusting and displaying module 140, an outstanding event detecting module 150 and a screen image splitting module 160. The electronic device 100 of the present embodiment may be a mobile phone, a personal digital assistant (PDA) or a smart phone, etc, which is not limited by the present invention. Wherein, states of the electronic device 100 may be switched according to an actual requirement. For example, when the electronic device is not operated for a while, it may be switched to a screen lock state, so as to turn off most of the operation functions thereof.

The outstanding event type obtaining module 120 is used for obtaining various outstanding event types such as missed call, missed message, missed voice mail or missed mail, etc. Wherein, the missed call may correspond to a missed voice call or a missed video call, and the missed mail may correspond to a missed text mail or a missed multimedia mail, etc., which is not limited by the present invention. It should be noted that the outstanding event type obtaining module 120 only obtains the outstanding event types with corresponding occurrence time thereof being greater than 0.

The amount counting module 130 is used for counting an amount of the outstanding event types obtained by the outstanding event type obtaining module 120. The icon adjusting and displaying module 140 adjusts a displaying position of an icon of each outstanding event type on the screen 110 according to the amount of the outstanding event types when the electronic device 100 is in the screen lock state.

The outstanding event detecting module 150 is used for detecting any outstanding event belonged to the aforementioned outstanding event types, and renewing the occurrence time of the corresponding outstanding event type each time when an outstanding event is detected.

The screen image splitting module 160 is used for horizontally splitting the screen 110 into a plurality of areas, wherein one of the areas is defined as a specific area. In an embodiment, the icon adjusting and displaying module 140 may averagely arrange and display icons of the outstanding event types with corresponding occurrence time thereof being greater than 0 in the specific area.

Figure 2:
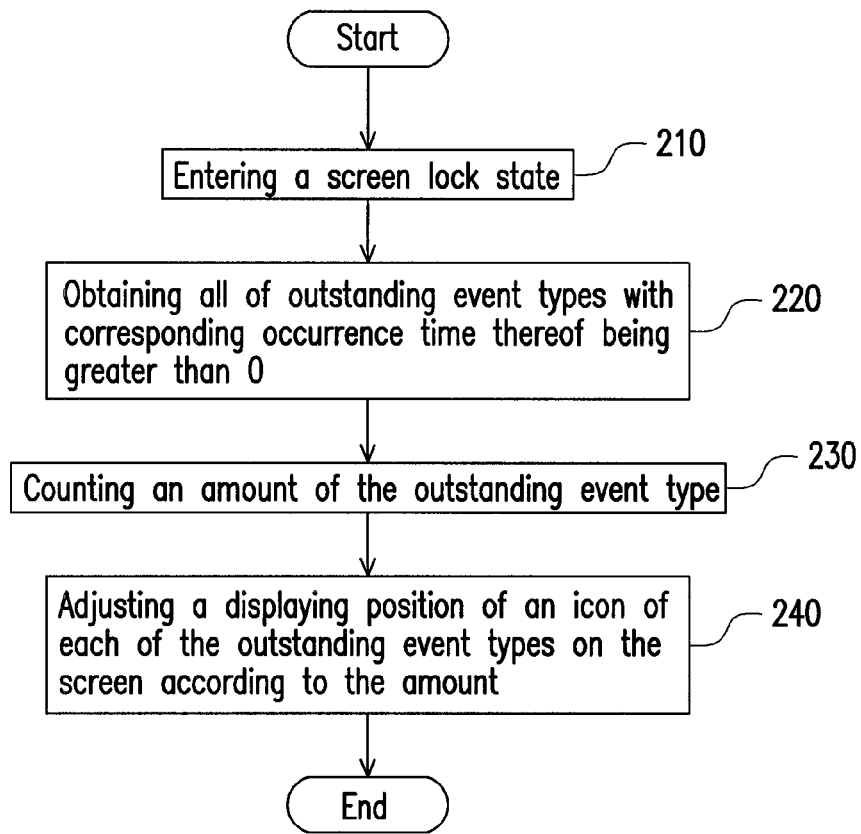
FIG. 2 is a flowchart illustrating a method for prompting outstanding event in a screen lock state according an embodiment of the present invention.

To describe the method of prompting the outstanding events after the electronic device 100 enters the screen lock state in detail, another embodiment is provided for detail description. FIG. 2 is a flowchart illustrating a method for prompting outstanding event in a screen lock state according an embodiment of the present invention. Referring to FIG. 1 and FIG. 2, first, in step 210, the electronic device 100 enters the screen lock state.

After the electronic device 100 enters the screen lock state, in step 220, the outstanding event type obtaining module 120 obtains all the outstanding event types (such as missed call, missed message, missed voice mail and missed mail, etc.) with the corresponding occurrence time thereof being greater than 0. Next, in step 230, the amount counting module 130 counts the amount of the outstanding event types.

Finally, in step 240, the icon adjusting and displaying module 140 adjusts the displaying position of the icon of each outstanding event type on the screen 110 according to the amount of the outstanding event types. In the present invention, the icon adjusting and displaying module 140 displays the icons in the specific area defined by the screen image splitting module 160 according to the amount of the outstanding event types.

Furthermore, the icon adjusting and displaying module 140 first divides the specific area into a plurality of display blocks matching the amount according to a size of the specific area and the amount of the outstanding event types. Then, the icon of one of the outstanding event types is displayed in each of the displaying blocks. By such means, the icons of all the outstanding event types with the corresponding occurrence time thereof being greater than 0 then may be averagely arranged and displayed in the displaying blocks via the icon adjusting and displaying module 140.

In another embodiment, when the icon adjusting and displaying module 140 displays the icons of the outstanding event types in the displaying blocks, the icon adjusting and displaying module 140 further simultaneously displays the corresponding occurrence time of the outstanding event types. For example, the icon adjusting and displaying module 140 overlappedly displays a specific icon including the occurrence time at the icon of the outstanding event type. Namely, the user may not only clearly know the present outstanding event types via the icons thereof displayed in the specific area of the screen 110, but may also clearly know the occurrence time of the outstanding event types.

Figure 3:
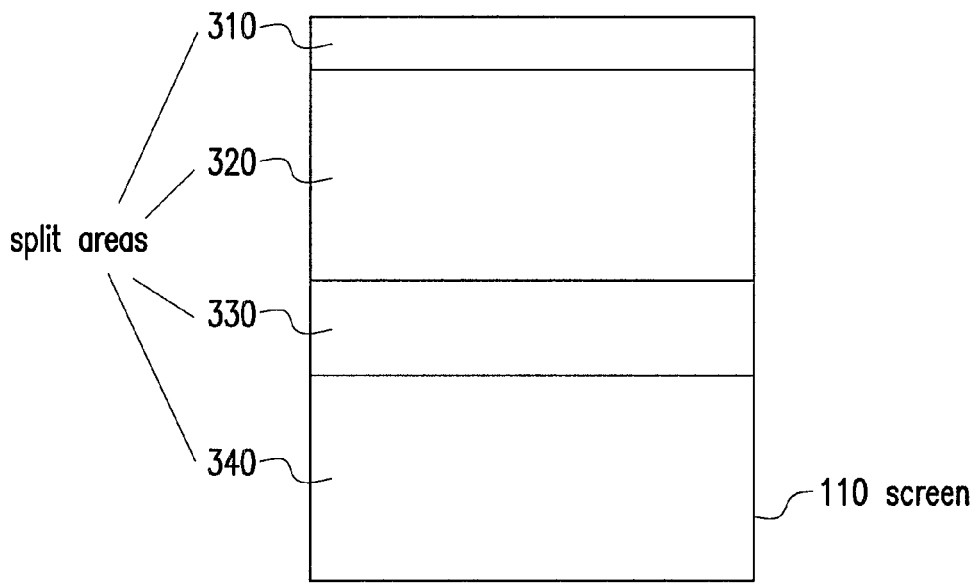
FIG. 3 is a schematic diagram illustrating a screen of an electronic device according to an embodiment of the present invention.

FIG. 3 is a schematic diagram illustrating a screen of an electronic device according to an embodiment of the present invention. Referring to FIG. 1 and FIG. 3, in the present embodiment, the screen image splitting module 160 splits the screen 110 into four areas 310, 320, 330 and 340. For convenience, assuming the area 340 is defined as the specific area, and the outstanding event type obtaining module 120 obtains 3 outstanding event types with the corresponding occurrence time thereof being greater than 0 after the electronic device 100 enters the screen lock state. Then, the icon adjusting and displaying module 140 may averagely divide the specific area 340 into 3 displaying blocks, and respectively display the icons of the outstanding event types in the 3 displaying blocks.

Figure 4:
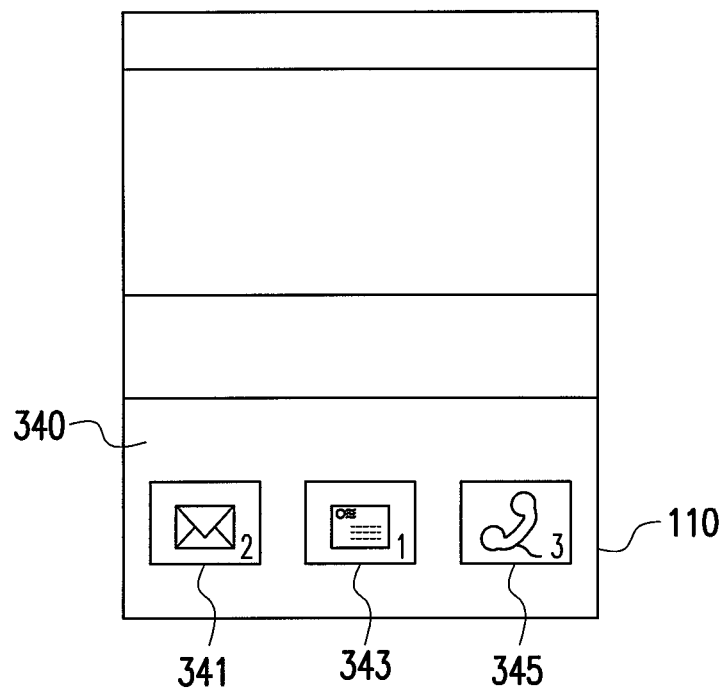
FIG. 4 is a schematic diagram illustrating a screen of an electronic device according to another embodiment of the present invention.

Assuming the 3 outstanding event types obtained by the outstanding event type obtained module 120 are respectively missed message, missed mail and missed call, the screen 110 of the electronic device 100 is then as shown of FIG. 4. Wherein, a missed message icon 341, a missed mail icon 343 and a missed call icon 345 are averagely arranged and displayed in the specific area 340. In the present embodiment, the corresponding occurrence time of each outstanding event type is also displayed at the displaying position of each icon. Accordingly, the user may know there are 2 missed messages, 1 missed mail and 3 missed calls presently waiting for being processed via an image displayed on the screen 110.

Figure 5:
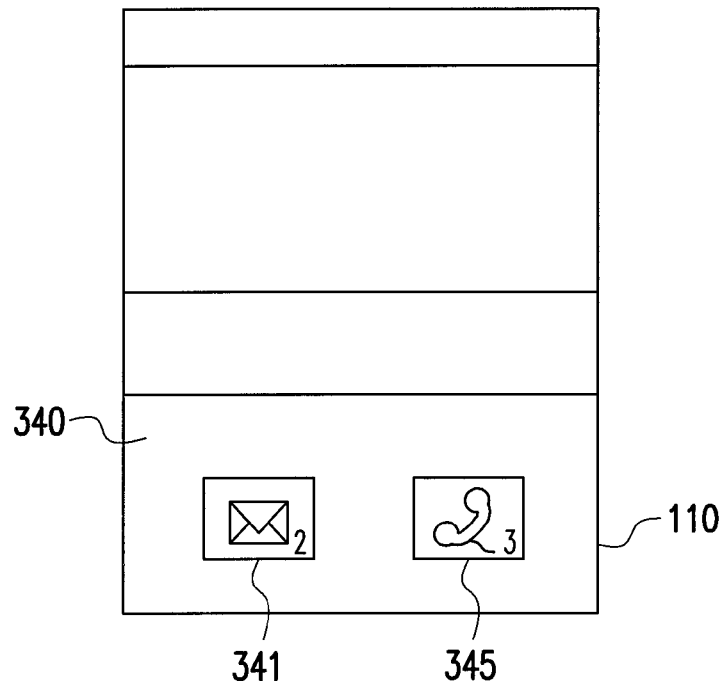
FIG. 5 is a schematic diagram illustrating a screen of an electronic device according to still another embodiment of the present invention.

In the present embodiment, it is assumed that the user unlocks the screen of the electronic device 100, and enters a mail application program to read the missed mail. Then, when the user again switches the electronic device 100 to the screen lock state, an image displayed on the screen 110 is then as shown of FIG. 5. Referring to FIG. 5, since the mail has been read (i.e. the occurrence time of the missed mail is changed from 1 to 0), the outstanding event type obtaining module 120 then may only obtain two outstanding event types, which are respectively the missed message and the missed call. Accordingly, the icon adjusting and displaying module 140 may divide the specific area 340 into two displaying blocks, so as to respectively display the missed message icon 341 and the missed call icon 345. Similarly, the icon adjusting and displaying module 140 may also simultaneously display the corresponding occurrence time of the missed messages and the missed calls.

As described above, the icon adjusting and displaying module 140 may dynamically adjust the displaying positions of the icons according to the amount of outstanding event types. In detail, after the electronic device 100 enters the screen lock state, the user may only observe the icons of the outstanding event types with the corresponding occurrence time thereof being greater than 0 on the screen 110, and the icons of the outstanding event types are not overlapped to each other or covered with one another, but are dispersedly and averagely arranged and displayed in the specific area, so as to facilitate observation of the user.

In another embodiment of the present invention, after the electronic device 100 enters the screen lock state, the outstanding event detecting module 150 may still detect different outstanding events. The outstanding event type obtaining module 120 obtains all the outstanding event types with the corresponding occurrence time thereof being greater than 0 each time when the outstanding event detecting module 150 detects a new outstanding event. Then, the icon adjusting and displaying module 140 displays the icons of the outstanding event types according to a present amount of the outstanding event types. Since method of displaying the icons is the same or similar to that of the aforementioned embodiment, detailed description thereof will not repeated.

It should be noted that the aforementioned method for prompting outstanding event in the screen lock state may be applied to any electronic device having a processor. In other words, the aforementioned embodiment may be designed as a computer program including a plurality of program codes, and the computer program may be stored in a storage medium (such as an optical disc, a floppy disk, or a removable disk, etc.). After the computer program is loaded to the electronic device, the aforementioned method for prompting outstanding event in the screen lock state then may be executed in the electronic device.

In summary, according to the method for prompting outstanding event in the screen lock state, the electronic device thereof and the storage medium thereof of the present invention, displaying positions of the corresponding icons on the screen may be dynamically adjusted according to the amount of the outstanding event types with corresponding occurrence time being greater than 0, so as to facilitate the user to check the outstanding event types and the occurrence time thereof in the screen lock state, and accordingly utilization convenience of the electronic device is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for prompting outstanding event in screen lock state, adapted to an electronic device in a screen lock state, wherein the electronic device comprises a screen, the method comprising:
  obtaining at least one outstanding event type, wherein an occurrence time corresponding to each of the outstanding event types is greater than 0;
  counting an amount of the outstanding event types; and adjusting a displaying position of an icon of each of the outstanding event types on the screen according to the amount.

2. The method for prompting outstanding event in screen lock state as claimed in claim 1, wherein the outstanding event type at least comprises one of missed call, missed message, missed voice mail and missed mail.

3. The method for prompting outstanding event in screen lock state as claimed in claim 1, wherein the step of adjusting the displaying position of the icon of each of the outstanding event types on the screen according to the amount comprises:
displaying the icon in a specific area of the screen according to the amount.

4. The method for prompting outstanding event in screen lock state as claimed in claim 3 further comprising:
horizontally splitting the screen into a plurality of areas; and
defining one of the areas as the specific area.

5. The method for prompting outstanding event in screen lock state as claimed in claim 3, wherein the step of displaying the icon in the specific area of the screen comprise:
dividing the specific area into at least one displaying block matching the amount according to a size of the specific area and the amount; and
respectively displaying one of the icons in each of the displaying blocks.

6. The method for prompting outstanding event in screen lock state as claimed in claim 5, wherein the step of respectively displaying one of the icons in each of the displaying blocks comprises:
averagely arranging and displaying the icon in the displaying block.

7. The method for prompting outstanding event in screen lock state as claimed in claim 5, wherein the step of respectively displaying one of the icons in each of the displaying blocks comprises:
displaying the occurrence time of the outstanding event type corresponding to the icon.

8. The method for prompting outstanding event in screen lock state as claimed in claim 7, wherein step of displaying the occurrence time comprises:
overlappedly displaying a specific icon at the displaying position of the icon, wherein the specific icon comprises the occurrence time.

9. The method for prompting outstanding event in screen lock state as claimed in claim 1 further comprising:
obtaining all of outstanding event types with corresponding occurrence time thereof being greater than 0 when an outstanding event belonging to one of the outstanding event types is detected.

10. The method for prompting outstanding event in screen lock state as claimed in claim 9 further comprising:
renewing the occurrence time of the corresponding outstanding event type when the outstanding event is detected.

11. The method for prompting outstanding event in screen lock state as claimed in claim 1 further comprising:
obtaining all of outstanding event types with corresponding occurrence time thereof being greater than 0 when the electronic device enters the screen lock state.

12. An electronic device, comprising:
a screen;
an outstanding event type obtaining module, for obtaining at least one outstanding event type, wherein an occurrence time corresponding to each of the outstanding event types is greater than 0;
an amount counting module, for counting an amount of the outstanding event type; and
an icon adjusting and displaying module, for adjusting a displaying position of an icon of each of the outstanding event types on the screen according to the amount, when the electronic device enters a screen lock state.

13. The electronic device as claimed in claim 12, wherein the outstanding event type at least comprises one of missed call, missed message, missed voice mail and missed mail.

14. The electronic device as claimed in claim 12, wherein the icon adjusting and displaying module is used for displaying the icon in a specific area of the screen according to the amount.

15. The electronic device as claimed in claim 14 further comprising:
a screen image splitting module, for horizontally splitting the screen into a plurality of areas, and defining one of the areas as the specific area.

16. The electronic device as claimed in claim 14, wherein the icon adjusting and displaying module is used for dividing the specific area into at least one displaying block matching the amount according to a size of the specific area and the amount, and respectively displaying one of the icons in each of the displaying blocks.

17. The electronic device as claimed in claim 16, wherein the icon adjusting and displaying module is used for averagely arranging and displaying the icon in the displaying block.

18. The electronic device as claimed in claim 12, wherein the icon adjusting and displaying module is used for displaying the occurrence time of the outstanding event type corresponding to the icon.

19. The electronic device as claimed in claim 12, wherein the icon adjusting and displaying module overlappedly displays a specific icon at the displaying position of the icon, wherein the specific icon comprises the occurrence time.

20. The electronic device as claimed in claim 12 further comprising:
an outstanding event detecting module, for detecting an outstanding event belonging to one of the outstanding event types, and renewing the occurrence time of the outstanding event type corresponding to the outstanding event.

21. The electronic device as claimed in claim 12, wherein the outstanding event type obtaining module is used for obtaining all of outstanding event types with corresponding occurrence time thereof being greater than 0 when the outstanding event detecting module detects the outstanding event.

22. The electronic device as claimed in claim 12, wherein the outstanding event type obtaining module is used for obtaining all of outstanding event types with corresponding occurrence time thereof being greater than 0 when the electronic device enters the screen lock state.

23. A storage medium, for storing a computer program, wherein the computer program comprises a plurality of program codes, and is adapted to be loaded to an electronic device for executing a method for prompting outstanding event in screen lock state, wherein the method comprises:
obtaining at least one outstanding event type, wherein an occurrence time corresponding to each of the outstanding event types is greater than 0;
counting an amount of the outstanding event types; and
adjusting a displaying position of an icon of each of the outstanding event types on the screen according to the amount.

* * * * *